United States Patent [19]

Rose et al.

[11] 4,320,450

[45] Mar. 16, 1982

[54] PROTECTION APPARATUS FOR MULTIPLE PROCESSOR SYSTEMS

[75] Inventors: Steven A. Rose, Glendale; Edward H. Forrester, Phoenix, both of Ariz.

[73] Assignee: Honeywell Inc., Minneapolis, Minn.

[21] Appl. No.: 89,493

[22] Filed: Oct. 30, 1979

[51] Int. Cl.³ .................... G06F 15/16; G06F 11/30
[52] U.S. Cl. .................................................. 364/200
[58] Field of Search ... 364/200 MS File, 900 MS File; 365/228; 371/13, 66

[56] References Cited

U.S. PATENT DOCUMENTS

| | | | |
|---|---|---|---|
| 3,286,239 | 11/1966 | Thompson et al. | 364/200 |
| 4,091,455 | 5/1978 | Woods et al. | 364/200 |

*Primary Examiner*—Joseph M. Thesz
*Assistant Examiner*—Thomas M. Heckler

*Attorney, Agent, or Firm*—Laurence J. Marhoefer; Lockwood D. Burton

[57] ABSTRACT

In a data protection apparatus for a multiple CPU system having a common or multiported bulk memory, an interface structure is associated with each of the CPU's. The interface structure cooperates with a firmware engine which is, in turn, a part of the interface control means which controls the transfer of data between the common bulk memory apparatus and each of the several CPU's in the system. Signals generated by the individual CPU's indicative of an emergency situation are applied as input signals to the interface structure. The interface structure then translates those signals into an attention flag signal and signals identifying the source or nature of the emergency. The firmware engine then responds to those signals and effects the necessary measures to protect the data relative to the affected CPU.

9 Claims, 4 Drawing Figures

PROTECTION APPARATUS FOR MULTIPLE PROCESSOR SYSTEMS

BACKGROUND OF THE INVENTION

The present invention relates to computer apparatus. More particularly, it relates to a protective interrelation apparatus and method for multiple processor systems.

In some computer based control systems, a plurality of central processor units (CPU's) may work in conjunction with a common bulk memory means. In such an arrangement, there will, of necessity, be interface control means for controlling the access of the several CPU's to the common memory. It is a normal function of such interface control means to control the transfer of data between the bulk memory and the several CPU's under a normal priority routine. If, however, there occurs an emergency situation in one or more of the CPU's, valuable data may be lost or incorrect data transferred in the absence of protective measures to avoid said eventuality. For example, if the power supply should fail in one of the CPU's, there is a time frame of one millisecond in which all transactions relating to that CPU must be accomplished in order to preserve accurate data relative to that CPU.

SUMMARY OF THE INVENTION

It is, accordingly, an object of the present invention to provide protection means and methods responsive to emergency conditions at any of the CPU's of a multiple CPU system.

It is another object of the present invention to provide control means responsive to emergency conditions at any of the CPU's of a multiple CPU system for initiating protective measures.

In accomplishing these and other objects, there has been provided, in accordance with the present invention, an interface structure associated with each of the CPU's in a multiple CPU system. The interface structure cooperates with a firmware engine which is, in turn, a part of the interface control means which controls the transfer of data between the common bulk memory apparatus and each of the several CPU's in the system. The signal generated by the individual CPU's indicative of an emergency situation are applied as input signals to the interface structure. The interface structure then translates those signals into an attention flag signal and signals identifying the source or nature of the emergency. The firmware engine then responds to those signals and effects the necessary measures to protect the data relative to the affected CPU.

BRIEF DESCRIPTION OF THE DRAWINGS

A better understanding of the present invention may be had from the following detailed description when read in the light of the accompanying drawings in which.

DETAILED DESCRIPTION

Figure 1:
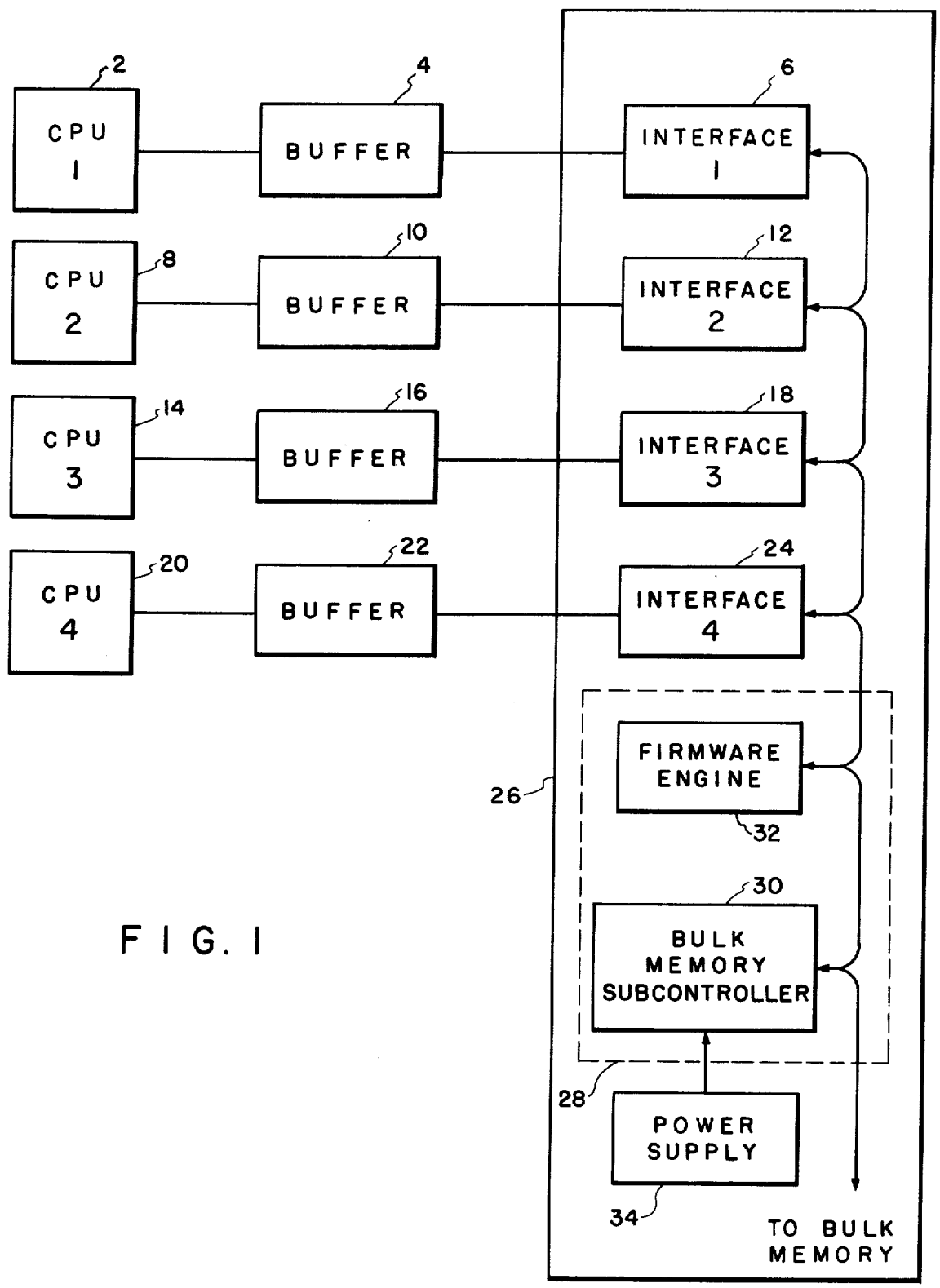
FIG. 1 is a block diagram of a multiple CPU system embodying the present invention.

Referring now to the drawings in more detail, there is shown in FIG. 1 a computer system wherein a plurality of CPU's (four such CPU's being illustrated) are connected to share the services of a common bulk memory structure. A first CPU 2 is connected through a port buffer 4 to a first interface unit 6. A second CPU 8 is connected through a buffer 10 to a second interface unit 12. A third CPU 14 is connected through a buffer 16 to a third interface unit 18. Similarly, a fourth CPU 20 is connected through a buffer 22 to a corresponding interface unit 24. In an exemplary embodiment of the present invention, each of the buffers 4, 10, 16 and 22 are closely associated with the corresponding CPU. Again in the exemplary embodiment, each of the interface units 6, 12, 18 and 24 were mounted in a bulk memory controller cabinet 26.

Also included in the cabinet 26 is a bulk memory controller 28 which includes a bulk memory subcontroller 30 and a firmware engine 32. A common power supply unit 34 is also included in the cabinet 26 and supplies power to the bulk memory controller system as well as to each of the interface units 6, 12, 18 and 24. The interface units 6, 12, 18 and 24 as well as the firmware engine 32 and the bulk memory subcontroller 30 are interconnected as by a cascade ribbon interconnect cable. The buffers 4, 10, 16 and 22 each include a plurality of line drivers and receivers and provide a measure of load buffering between the corresponding CPU's and the associated interface units. The interface units 6, 12, 18 and 24 will be described in more detail hereinafter. The firmware engine 32 in the bulk memory controller 28 comprises a microprocessor together with its predetermined operating instructions stored in its internal memory. The operation of this firmware engine will also be discussed in greater detail hereinafter. The bulk memory subcontroller 30 controls the actual interchange of information between the several CPU's 2, 8, 14 and 20 and a bulk memory apparatus (not specifically shown herein). The operation of the bulk memory subcontroller 30 is also directed by the firmware engine 32.

Figure 2:
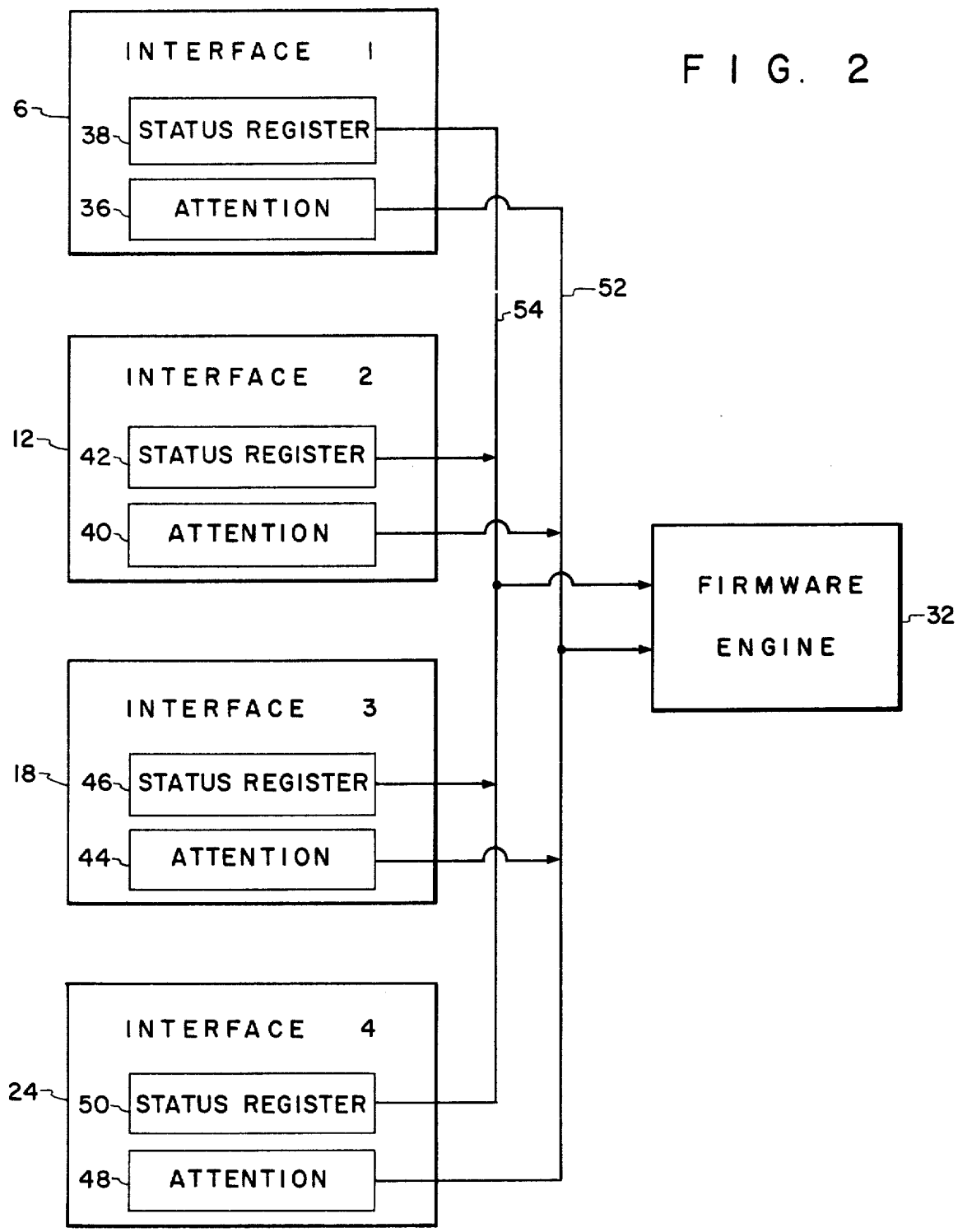
FIG. 2 is a block diagram illustrating the structural relationships embodying the present invention.

In each of the interface units 6, 12, 18 and 24, there is an attention logic arrangement which responds to certain output signals from the associated CPU's indicating predetermined conditions at the associated CPU. The attention logic arrangement is illustrated generally in FIG. 2 which illustrates the interconnection of the several interface units and the firmware engine. Thus, as shown in FIG. 2, a first interface unit 6 includes an attention unit 36 which provides an output signal whenever the associated CPU is in one of the predetermined conditions as hereinbefore mentioned. A status register 38 in the first interface unit 6 is arranged to include data which would be indicative of the particular one of the predetermined conditions noted hereinbefore. The second interface unit 12 has a similar attention unit 40 and a status register 42. The third interface unit 18 also has an attention unit 44 and a status register 46. In a like manner, the fourth interface unit 24 also has an attention unit 48 and a status register 50. In each of the interface units 12, 18 and 24 the attention unit corresponds in function to that of the attention unit 36 in the first interface unit. Similarly, the status register in each of the interface units 12, 18 and 24 correspond in function to that of the register 38 in the first interface unit 6. The significant position in the first register of each of the interface units are connected in common to one input of the firmware engine 32. The significant bit positions of the second registers are similarly connected to a corresponding unit of the firmware engine 32. In FIG. 2 this latter connection is illustrated schematically with a single common line 54.

In operation of the system the firmware engine 32, under the control of its internal instructions controls the transfer of data between the several CPU's and the multiported bulk memory. As a part of that instruction in the firmware engine 32, the common line 52 is examined on a periodic basis to determine if there is an attention signal present on the significant bit position of any of the registers 36, 40, 44 and 48. Depending on the circumstances, the frequency of that periodic testing the line 52 may occur at a rate which approaches the range of once every 500 nanoseconds. If there is no attention signal present at any of the interface units 6, 12, 18 and 24, the firmware engine returns to its ordinary operation of controlling the transfer of data to and from the several CPU's in accordance with their established priority. If, on the other hand, an attention signal is present at one of the interface units the firmware engine then scans the input terminals thereto represented by the cable 54 to determine, first, which of the interface units is carrying the attention flag and, second, to determine what type of emergency caused the flag to be up, as will be more clearly seen after discussions of FIGS. 3 and 4. When the affected CPU has been identified, the firmware engine immediately completes any transaction scheduled relative to that CPU. The firmware engine then determines if there are other attention flags active and, if so, identifies and completes transactions relating to those CPU's. When all attention flags have been acknowledged and handled, the firmware engine returns to its basic task of servicing requests for bulk transfer.

Figure 3:
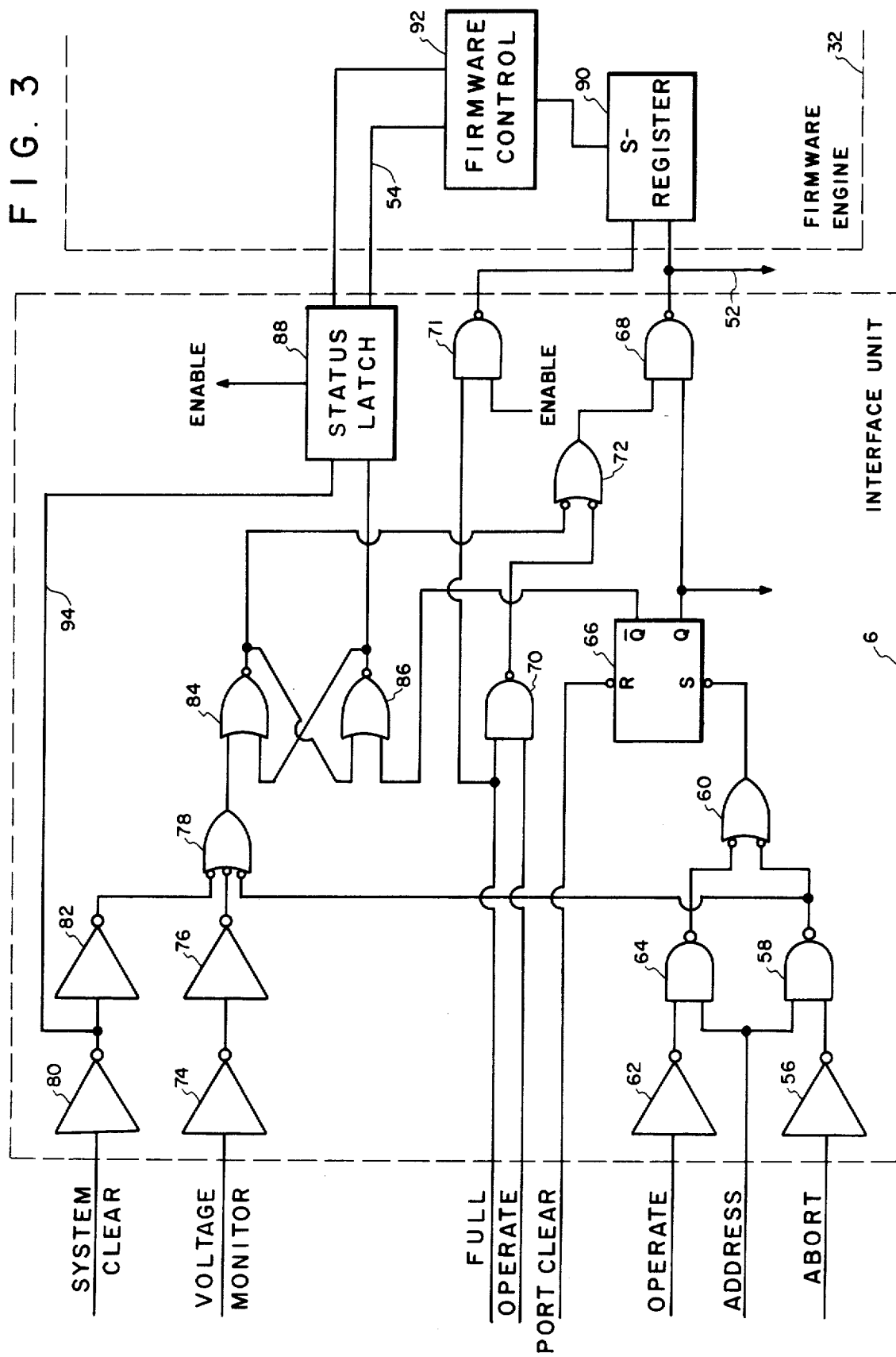
FIG. 3 is a schematic logic diagram illustrating features according to the present invention.

In FIG. 3 there is shown a detailed logic diagram of the attention logic arrangement of an exemplary structure constructed in accordance with the present invention. This structure illustrates a form of logic system which may be included in each of the interface units 6, 12, 18 and 24. FIG. 3 will be described as relating to interface unit 6 with the the understanding that all the interface units are substantially identical. The interface unit 6, it will be recalled, is interconnected between the CPU 2 by way of the buffer 4 and the bulk memory subcontroller 30. Thus the input signals to the attention logic system of the interface unit 6 are received by way of a multiconductor bus from the CPU 2. Corresponding input signals would be applied to the input of the other interface units from their associated CPU's.

In the illustrated interface unit 6, there is provided a first inverting buffer amplifier 56 connected to receive an ABORT signal from the CPU. The output of the inverter 56 is connected to one input terminal of a two-input NAND gate 58. The output of the NAND gate 58 is connected to one input terminal of a two input NOR gate 60. A second inverting input buffer amplifier 62 is connected to receive an operate signal from the CPU. The output of the inverter 62 is connected to one input terminal of a two input NAND gate 64. An enable signal for the NAND gates 58 and 64 is applied to the other input terminal of each of these gates from the CPU by a signal which is indicative that the present board or unit has been addressed. The output of the NAND gate 64 is connected to the other input terminal of the NOR gate 60. The output of the gate 60 is connected to the SET input terminal of a BUSY flip-flop 66. The RESET input of the flip-flop 66 is connected to receive a PORT CLEAR signal indicative that the reason for the emergency signal had been corrected or that the required transactions had been completed. The "Q" or SET output of the flip-flop 66 is connected to one input terminal of a NAND gate 68. The SET output of the flip-flop 66 is also connected to other circuit elements, not shown herein.

In accomplishing a transfer of data between the CPU and the ported bulk memory, there is provided in each of the interface units, a first-in, first-out (FIFO) memory stack 69 into which data and/or instructions are stored on a temporary basis during the course of the transfer. A signal indicating that the FIFO is being addressed is, for the purpose of this application, designated OPERATE'. That signal is applied as one input terminal of a NAND gate 70. If the FIFO is full and can accommodate no new entries, a signal, which for the purpose of this application is designated FIFO-NOT EMPTY, is generated which is applied to the second input terminal of the NAND gate 70 and to one input terminal of a line driver 71. The other input terminal is connected to enable the driver 71 whenever the particular unit is addressed by the firmware engine. The output of the gate 70 is applied as one input terminal of a NOR gate 72. The output of the gate 72 is applied as the second input of the NAND gate 68. The output of the gate 68 corresponds to the output of the attention unit 36 in the first interface unit 6 illustrated in FIG. 2. A lead 52 connected to the output of the NAND gate 68 corresponds to the lead 52 of FIG. 2 which connects the output of the attention unit on all of the interface units to a single common input terminal of the firmware engine 32.

As was earlier mentioned, if there is a failure in the power supply to the CPU, there will be a signal generated indicating that power failure. For the purpose of this application, that signal is designated VOLTAGE MONITOR and is applied to the input of an inverting buffer amplifier 74. The output of the inverter 74 is connected to the input of a second inverter 76, the output of which is connected to one input terminal of a three input NOR gate 78. The output of the NOR gate 58 is also applied as an input signal to a second input terminal of the NOR gate 78. The CPU may also issue a SYSTEM CLEAR signal. That signal is applied as an input signal to an inverting buffer amplifier 80 the output of which is applied to the input of a second inverter 82. The output of the inverter 82 is connected to the third input terminal of the NOR gate 78.

A pair of NOR gates 84 and 86 are interconnected to form a latch arrangement. The output of the NOR gate 78 is connected to one input terminal of the NOR gate 84. The $\overline{Q}$ output of the BUSY flip-flop 66 is connected to one input terminal of the NOR gate 86. The output terminal of the NOR gate 86 is connected to the second input terminal of the NOR gate 84 while the output terminal of the NOR gate 84 is connected to the second input terminal of the NOR gate 86. The output terminal of the NOR gate 84 is also connected to the second input terminal of the NOR gate 72. The output terminal of the NOR gate 86 is also connected to one input of a status latch 88. In actual practice, the status latch may be a portion of a larger storage register. The output of the inverter 80 is connected to a second input of the status latch 88.

The NAND gate 68 may be referred to as an attention driver, and is connected, in common with the attention driver of each of the other interface units, to an input of a status or S-register 90 forming a part of the firmware engine 32. The FIFO-NOT-EMPTY signal is also applied to another input terminal of the S-register 90. The output of the S register 90 is connected to one input of a firmware control unit 92. The output of the status latch 88 of each of the interface units is connected, in common to the firmware control unit 92 by the lead 54.

In the operation of the system as illustrated in FIG. 3 the OPERATE signal applied to the input of the inverter 62 may be anyone of a group of signals indicating a particular operation for the transfer of data between the CPU and the ported bulk memory. By design that signal is mutually exclusive with respect to the ABORT signal which would be applied to the input of the inverter 56. The OPERATE signal in conjunction with a signal indicating that the particular interface unit had been addressed is transmitted through the NAND gate 54 and the NOR gate 60 to the SET input terminal of the BUSY flip-flop 66. Thus the coincidence of the address signal and any of the OPERATE signals is effective to set the flip-flop 66 to indicate that the interface unit is busy. The Q output of the flip-flop 66 enables the gate 68. If, while the gate 68 is enabled, the OPERATE' signal, which is used to address the FIFO, coincides with the signal indicating that the FIFO is not empty, the gate 70 is actuated, passing the signal to the NOR gate 72 thereby completing the actuation of the attention drive 68 to signify to the firmware engine that the particular channel represented by the indicated interface unit and its associated CPU need attention from the firmware engine and the ported bulk memory.

In the exemplary embodiment constructed in accordance with the present invention, the attention signal output by the driver 68 is loaded into bit position No. 7 of the S-register 90. Similarly, the output of the line driver 71 is, when enabled, loaded into bit position No. 6 of the S-register 90. As was hereinbefore noted, the firmware engine periodically interrogates the S-register to determine if there is an attention signal present at the output of any of the interface units. Having determined the presence of an attention signal in bit No. 7 of the S-register 90, the firmware engine then sequentially addresses the several interface units to determine which of them requires attention and then to determine the nature of the attention required. In the operation discussed thus far, when the interface unit 6 is addressed, the line driver 71 is enabled and the signal indicating the not empty condition of the FIFO on that board is lodged into bit position No. 6. This signal is recognized by the firmware engine and a subroutine is initiated to read data out of the indicated FIFO into certain other storage registers to partially empty the FIFO, thereby to enable the insertion of the new data therein. If that had been the only requirement for attention at the addressed interface unit, the firmware engine would issue a PORT CLEAR signal which would then reset the busy flip-flop and thereby remove the attention signal from the output of the driver 68. The firmware engine would then return to the routine in which it had been engaged before the diversion to the attention routine.

The CPU may also transmit to the interface unit 6 an ABORT signal which is applied to the input of the inverter 56 and, when gated by the address signal, is transmitted through the gate 58 and the gate 60 to set the BUSY flip-flop 66 thereby enabling the driver 68. The output of the gate 58 is also applied to one of the input terminals of the gate 78 which, in turn, sets the latch formed by the gates 86, 84. The SET output of the gate 84 is applied through the gate 72 to the second input of the enabled driver 68. This combination also will set the attention signal into the bit 7 position of the S-register 90.

The output of the gate 86 is applied to an input of the status latch 88 and, in the exemplary embodiment will set the bit 7 position. When the firmware engine 32 has detected that an attention signal is present in the S-register 90, it again polls the several interface units sequentially and "enables" an output from the status latch 88 to identify that the particular interface unit is the one calling for attention and identifies the nature of the call for attention. When the firmware engine has thus recognized the identifying signal in the No. 7 bit position and the status latch 88, a PORT CLEAR routine is instituted which causes any required data transfer between the indicated CPU and the bulk memory to be immediately completed. The firmware engine then issues a PORT CLEAR signal which is applied to reset the BUSY flip-flop 66, thereby resetting the latch 86, 84 and disabling the driver 68.

Another signal that may be generated by this CPU is a VOLTAGE MONITOR alarm signal from a voltage monitor indicating that there has been a failure in the power supply of that CPU. That signal is applied as an input signal to the inverter 74, thence to the inverter 76 and to a second input of the NOR gate 78. The signal on the NOR gate 78 causes the latch 84, 86 to be set. The operate signal applied to the inverter 62 will, as hereinbefore described enable the output driver 68. The VOLTAGE MONITOR signal, having set the latch 84, 86, will cause the driver 68 to produce an attention signal, as before. The latch element 86 also registers the signal in the bit 7 position of the status latch 88. As before, the firmware engine clearly terminates any on-going data transfers and then initiates the PORT CLEAR routine, which clears all outstanding requests from that port and sets the port not busy. Software in the CPU recognizes when this has occurred and proceeds to sequence the power-removal from the computer. The completion of that transaction is essential before the actual loss of power at the CPU occurs. The interval between the occurrence of the VOLTAGE MONITOR signal and the total loss of power from the CPU, as hereinbefore noted, is about one millisecond. The actual transfer of the data between the CPU and the bulk memory takes a small portion of that time. Accordingly, the frequent scanning by the firmware engine of the bit 7 position in the S-register to detect the presence or absence of such an attention signal provides ample time for the completion of the necessary transfers before the loss of power causes potentially erroneous alteration of the stored data.

Still another signal that may be generated by the CPU is a SYSTEM CLEAR signal which is applied to the input of the inverter 80 the output of which is applied through the inverter 82 to the third input terminal of the NOR gate 78. As before, the application of a signal to one of the input terminals of the NOR gate 78 causes the latch 84, 86 to be set thereby establishing the attention signal at the output of the NAND gate 68 and the bit 7 position of the S-register 90. Also the setting of the latch 84, 86 sets a signal into the bit 7 position of the status latch 88. As before, the firmware engine checks the S-register for the attention signal then checks to determine the source of the attention signal, followed by the PORT CLEAR routine.

It will be noted that the output of the inverter 80 is also connected by a lead 94 to a different input of the status latch 88. That connection, is useful in a different routine, not a part of the present invention. Similarly, under certain conditions, there will be a signal set in bit 5 position of the status latch 88. That signal is also read by the firmware engine and institutes a different routine is, again, not a part of the present invention.

Figure 4:
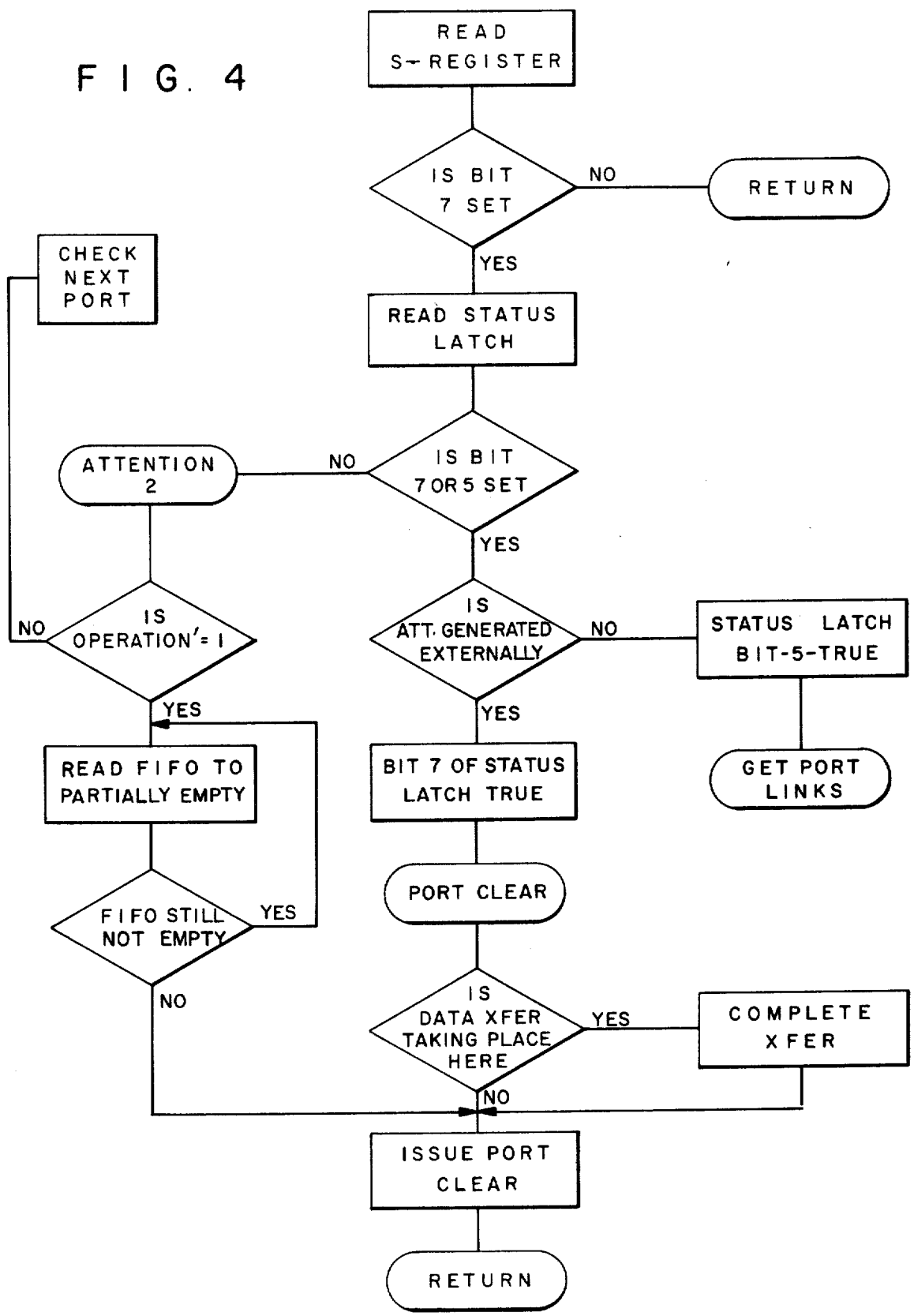
FIG. 4 is a flow chart helpful in understanding the operation of the structure in accordance with the present invention.

In FIG. 4 the flow diagram is illustrative of the operation of the firmware engine as it relates to the present invention and the logic diagram shown in FIG. 3. As an initial step the firmware engine will read the S-register to determine if bit 7, the attention signal, is set. If no attention signal is set the firmware engine will return to the routine upon which it was operating at the time that it paused to read the S-register. If the bit 7 position is set, then the firmware engine will read the status latch, first to determine if the 7 or 5 bit position is set. If neither is set, a subroutine identified as ATTENTION 2 is initiated. The first interface unit or port is examined to determine if the OPERATE' signal is equal to one. If, in the selected port, the OPERATE' signal is not equal to one then a check will be made of the second and succeeding ports. If the OPERATE' signal is set, the attention flag is indicative that the FIFO contains data requiring immediate (time-critical) service. Therefore, the firmware engine will cause the FIFO to be read and the data to be processed immediately. If after the first reading of the FIFO, the FIFO still contains data, then the process will be repeated until the FIFO is empty. When it is determined that the FIFO is not empty, then the firmware engine will issue a PORT CLEAR signal and return to its ongoing routine.

If, on reading the status latch, it is found that either the bit 7 position or the bit 5 position is set then the status latch is interrogated to determine which of the bit positions is set. If the bit 5 position is set a subroutine which is not a part of the present invention will be instituted. If the bit 7 position of the status latch is set, the firmware engine will initiate a PORT CLEAR routine which includes the termination of any data transfer in progress on the present port. Then a PORT CLEAR signal will be issued and the firmware engine will return to its basic task of servicing requests for bulk transfers.

Thus there has been provided, in accordance with the present invention, an improved protection means responsive to emergency conditions at any of the CPU's of a multiple CPU system in which immediate attention is given to the transfer of data between a CPU originating the attention signal and a multiported bulk memory.

The embodiments of the invention in which an exclusive proprety or privilege is claimed are defined as follows:

1. In a multiple processor system wherein a plurality of processor units are operatively associated with a common bulk memory unit and having a multiport memory control unit for controlling the transactions between said bulk memory unit and said processor units through a plurality of port interface units, a method for protecting data against loss in the event of predetermined conditions at one or more of said processor units, said method comprising;
providing signals from an affected processor unit indicative of a said predetermined condition,
deriving a first signal indicative of the presence of said predetermined condition,
deriving a second signal indicative of the identity of said predetermined condition,
actuating said memory control unit on a high frequency repetitive basis to interrupt an ongoing routine to detect a presence of said first signal,
upon the detection of such a first signal, further actuating said memory control unit to detect said second signal and, in response to said second signal, to institute a routine to protect the data relative to the affected processor unit,
then to resume the ongoing servicing of other processor's requests.

2. The method as set forth in claim 1 wherein said predetermined condition is a NOT-EMPTY condition of an associated FIFO memory unit and wherein said protective routine is directed to reading data from the FIFO memory unit until that unit is empty.

3. The method as set forth in claim 1 wherein said predetermined condition is a power-supply failure in the affected processor unit and said protective routine is directed immediately to terminate any indicated transfer of data relative to the affected processor unit before the power supply failure becomes effective.

4. The method as set forth in claim 1 wherein said second signals are unique to each of the several processor units and said actuation of said control unit to detect said second signal includes the step of polling said port interface units to determine the presence of a second signal at said port interface units, individually, and instituting said protective routine in response to the detection of said second signal at said port interface unit.

5. In a multiple processor system wherein a plurality of processor units are operatively associated with a common bulk memory unit and having a multiported memory control unit for controlling the transactions between said bulk memory unit and said processor units, protecting means for protecting data against loss in the event of the occurrence of a predetermined condition at one or more of said processor units, said protecting means including;
a plurality of port interface units, each operatively connected between said multiported memory control and one of said processor units, respectively;
said processor units being operative to produce output signals indicative of predetermined conditions thereat;
said port interface units including means responsive to said output signals from the associated one of said processor units to provide a first signal indicative of the presence of a said predetermined condition and a second signal indicative of the identity of the predetermined condition;
said first signal from all of said port interface units being connected to a common input to said multiported memory control unit; said multiported memory control unit being programmed to interrogate said common input on a high frequency repetitive basis to detect the presence of a first signal thereat;
said memory control unit being further programmed responsive to the presence of a first signal to interrogate said second signals to identify the predetermined condition; and
said memory control unit including means responsive to said second signal to control the operation of the affected one of said processor units relative to said bulk memory unit to protect the data relating to said affected processor unit.

6. Data protecting means as set forth in claim 5 wherein said predetermined condition indicative by said second signal is a not-empty condition of an associated FIFO memory unit and wherein said memory control unit is operative to read data from said FIFO memory until that unit is empty.

7. Data protecting means as set forth in claim 5 wherein said predetermined condition is indicative of a power supply failure at the affected one of said processor units, and wherein said memory control unit is operative to immediately complete any indicated transfer of data relative to the affected processor unit before the power supply failure becomes effective.

8. In a multiple processor system wherein a plurality of processor units are operatively associated with a common bulk memory unit and having a multiport memory control unit for controlling the transactions between said bulk memory unit and said processor units, a port interface unit connected between said memory control unit and each of said processor units, respectively, to provide attention signals for said memory control unit in response to predetermined condition indicating signals from the associated one of said processor units;

said port interface unit including:
  a first gating means responsive, alternatively, to a first or a second input signal from said associated one of said processor units,
  a flip-flop member, said flip-flop member being connected to be set by an output signal from said first gating means,
  a second gating means responsive to either of said first, a third or a fourth input signal from said associated one of said processor units,
  first latch means connected to the set by an output signal from said second gating means,
  a third gating means connected to produce an output signal upon the coincidence of a fifth and sixth input signal from said associated one of said processor units,
  a fourth gating means connected to be responsive to an output signal from said third gating means or a first output signal from said first latch means,
  a fifth gating means connected to produce an attention output signal upon a coincidence of an output signal from said fourth gating means and a set output signal from said flip-flop, and
  a second latch means connected to a second output of said first latch means to store an attention-identifying signal, said second latch means being selectively enabled to provide an attention-identifying output signal.

9. A port interface unit as set forth in claim 8 and including a sixth gating means connected to be responsive to said sixth input signal from said associated one of said processor units, said sixth gating means being selectively enabled to provide a second identifying output signal.

* * * * *